US008695223B2

(12) United States Patent
Ito

(10) Patent No.: US 8,695,223 B2
(45) Date of Patent: Apr. 15, 2014

(54) BUSH CUTTER WITH A VERSATILE OPERATING ROD

(75) Inventor: Ryosuke Ito, Anjo (JP)

(73) Assignee: Makita Corporation, Anjo-Shi (JP)

( * ) Notice: Subject to any disclaimer, the term of this patent is extended or adjusted under 35 U.S.C. 154(b) by 489 days.

(21) Appl. No.: 13/057,069

(22) PCT Filed: Jul. 6, 2009

(86) PCT No.: PCT/JP2009/062281
§ 371 (c)(1),
(2), (4) Date: Feb. 1, 2011

(87) PCT Pub. No.: WO2010/018719
PCT Pub. Date: Feb. 18, 2010

(65) Prior Publication Data
US 2011/0131816 A1 Jun. 9, 2011

(30) Foreign Application Priority Data

Aug. 11, 2008 (JP) ................................. 2008-206927

(51) Int. Cl.
*B26B 7/00* (2006.01)
*B26B 15/00* (2006.01)
*B26B 9/00* (2006.01)

(52) U.S. Cl.
USPC .............................. 30/276; 30/277.4; 30/347

(58) Field of Classification Search
USPC ............. 30/276, 277.4, 347; 56/17, 127, 245; 242/378, 378.1, 388, 388.1, 476.1, 242/587, 587.2, 587.3
See application file for complete search history.

(56) References Cited

U.S. PATENT DOCUMENTS

| 3,973,179 A | | 8/1976 | Weber et al. | |
|---|---|---|---|---|
| 4,189,905 A | * | 2/1980 | Frantello | 56/295 |
| 4,226,021 A | * | 10/1980 | Hoff | 30/276 |
| 4,236,310 A | * | 12/1980 | Muller | 30/276 |

(Continued)

FOREIGN PATENT DOCUMENTS

| CN | 2040295 U | 7/1989 |
|---|---|---|
| CN | 2513347 Y | 10/2002 |

(Continued)

OTHER PUBLICATIONS

Japanese Office Action issued in Japanese Application No. 2008-206927 dated Aug. 7, 2012 (w/translation).

(Continued)

*Primary Examiner* — Ghassem Alie
*Assistant Examiner* — Bharat C Patel
(74) *Attorney, Agent, or Firm* — Oliff PLC

(57) ABSTRACT

A bush cutter comprises an operating rod, a cutting unit, a main unit and a transfer shaft. The cutting unit is disposed at a front end of the operating rod and rotatably supports a cutting blade. The main unit is disposed at a rear end of the operating rod and houses a motor that drives the cutting blade. The transfer shaft is disposed within the operating rod and transfer output torque of the motor from the main unit to the cutting unit. An adapter is fixed to the rear end of the operating rod and the main unit is provided with a rod insertion hole configured to receive the rear end of the operating rod with the adapter fixed. This configuration may prevent the operating rod, which has versatility, from being erroneously assembled.

15 Claims, 8 Drawing Sheets

(56) References Cited

U.S. PATENT DOCUMENTS

| | | | |
|---|---|---|---|
| 4,501,332 A * | 2/1985 | Straayer | 172/41 |
| 4,603,478 A * | 8/1986 | Anderson | 30/276 |
| 4,616,169 A | 10/1986 | Proffitt | |
| 4,779,687 A | 10/1988 | Schreiber et al. | |
| 4,817,738 A * | 4/1989 | Dorner et al. | 173/162.1 |
| 4,860,451 A | 8/1989 | Pilatowicz et al. | |
| 5,181,369 A | 1/1993 | Everts | |
| 5,201,168 A * | 4/1993 | Jenson | 56/8 |
| 5,208,525 A | 5/1993 | Lopic et al. | |
| 5,265,341 A | 11/1993 | Kikuchi | |
| 5,298,821 A | 3/1994 | Michel | |
| 5,369,565 A | 11/1994 | Chen et al. | |
| 5,414,934 A * | 5/1995 | Schlessmann | 30/275.4 |
| 5,553,675 A | 9/1996 | Pitzen et al. | |
| 5,685,080 A | 11/1997 | Amano et al. | |
| 5,802,724 A * | 9/1998 | Rickard et al. | 30/296.1 |
| 5,855,069 A * | 1/1999 | Matsubayashi et al. | 30/276 |
| 5,902,080 A | 5/1999 | Kopras | |
| 6,006,434 A * | 12/1999 | Templeton et al. | 30/296.1 |
| 6,010,407 A * | 1/2000 | Ishikawa | 464/52 |
| 6,181,032 B1 | 1/2001 | Marshall et al. | |
| 6,206,107 B1 | 3/2001 | Wadge | |
| 6,213,677 B1 * | 4/2001 | Yamane et al. | 403/329 |
| 6,329,069 B1 * | 12/2001 | Azizi et al. | 428/600 |
| 6,345,844 B1 | 2/2002 | Miyajima et al. | |
| 6,568,089 B1 | 5/2003 | Popik et al. | |
| D482,582 S | 11/2003 | Chunn et al. | |
| 6,675,912 B2 | 1/2004 | Carrier | |
| 6,745,475 B1 * | 6/2004 | Trumpf | 30/276 |
| 6,754,962 B2 * | 6/2004 | Warashina et al. | 30/276 |
| 6,754,963 B2 * | 6/2004 | Warashina et al. | 30/276 |
| 6,810,589 B2 | 11/2004 | Lagaly et al. | |
| 6,842,984 B1 * | 1/2005 | Grant et al. | 30/276 |
| 6,921,285 B2 | 7/2005 | Glauning | |
| 7,070,009 B2 * | 7/2006 | Kawamoto et al. | 173/211 |
| 7,083,003 B1 * | 8/2006 | Pusateri et al. | 173/29 |
| 7,183,745 B2 | 2/2007 | Kubale et al. | |
| 7,480,998 B2 | 1/2009 | Suzuki et al. | |
| 7,493,696 B2 | 2/2009 | Suzuki et al. | |
| 2002/0170186 A1 | 11/2002 | Sakaguchi | |
| 2004/0106036 A1 | 6/2004 | Geis et al. | |
| 2005/0280394 A1 | 12/2005 | Kubale et al. | |
| 2006/0011358 A1 | 1/2006 | Motosko | |
| 2006/0090351 A1 | 5/2006 | Yoshida | |
| 2006/0096771 A1 | 5/2006 | Brotto | |
| 2006/0190001 A1 * | 8/2006 | Powell | 606/96 |
| 2006/0191144 A1 | 8/2006 | Suzuki et al. | |
| 2006/0248731 A1 | 11/2006 | Suzuki et al. | |
| 2007/0044321 A1 | 3/2007 | Kocha | |
| 2008/0235958 A1 | 10/2008 | Yoshida | |

FOREIGN PATENT DOCUMENTS

| | | |
|---|---|---|
| EP | 1 075 906 B1 | 6/2003 |
| EP | 1 738 638 A1 | 1/2007 |
| JP | A-63-266761 | 11/1988 |
| JP | U-64-22220 | 2/1989 |
| JP | U-3-27915 | 3/1991 |
| JP | A-3-119916 | 5/1991 |
| JP | U-3-99919 | 10/1991 |
| JP | U-5-63225 | 8/1993 |
| JP | U-5-87237 | 11/1993 |
| JP | A-10-56845 | 3/1998 |
| JP | A-2006-109776 | 4/2006 |
| JP | A-2006-217843 | 8/2006 |
| JP | A-2006-311828 | 11/2006 |
| JP | A-2006-314278 | 11/2006 |
| JP | A-2003-235772 | 8/2008 |
| SU | 1397671 A1 | 5/1988 |
| SU | 1687999 A1 | 10/1991 |

OTHER PUBLICATIONS

Mar. 29, 2012 Russian Office Action issued in Russian Patent Application No. 2011108451/13 (with translation).
Apr. 5, 2012 Russian Office Action issued in Russian Patent Application No. 2011108449/13 (with translation).
May 1, 2012 Japanese Office Action issued in Japanese Patent Application No. 2008-206927 (with translation).
May 8, 2012 Japanese Office Action issued in Japanese Patent Application No. 2008-206925 (with translation).
Nov. 13, 2012 Notification of Reasons for Rejection issued in Japanese Patent Application No. 2012-233049 (with English-language translation).
Oct. 18, 2012 Office Action issued in Chinese Patent Application No. 200980131337.3 (with partial translation).
Oct. 10, 2012 Office Action issued in Chinese Patent Application No. 200980131340.5 (with partial translation).
Extended European Search Report issued in European Application No. 09806614.5 dated Nov. 28, 2012.
International Search Report issued in International Patent Application No. PCT/JP2009/062280, dated Aug. 25, 2009, with English Translation.
Written Opinion issued in International Patent Application No. PCT/JP2009/062280, dated Aug. 25, 2009, with English Translation.
International Search Report issued in International Patent Application No. PCT/JP2009/062281, dated Sep. 15, 2009, with English Translation.
Written Opinion issued in International Patent Application No. PCT/JP2009/062281, dated Sep. 15, 2009, with English Translation.
U.S. Appl. No. 13/057,110, filed Feb. 1, 2011, by Ryosuke Ito.
Jan. 24, 2013 Extended European Search Report issued in European Patent Application No. 09806615.2.
Apr. 25, 2013 Office Action issued in U.S. Appl. No. 13/057,110.
Apr. 22, 2013 Office Action issued in Chinese Patent Application No. 200980131350.5 (with translation).
Sep. 29, 2013 Office Action issued in Chinese Patent Application No. 200980131340.5 (with partial English-language translation).
Sep. 9, 2013 Office Action issued in U.S. Appl. No. 13/057,110.
May 29, 2013 Office Action issued in Chinese Patent Application No. 2009801313373 (with translation).
Nov. 18, 2013 Office Action issued in Chinese Patent Application No. 200980131337.3 (with English-language translation).

* cited by examiner

BUSH CUTTER WITH A VERSATILE OPERATING ROD

TECHNICAL FIELD

This application claims priority to Japanese Patent Application No. 2008-206927 filed on Aug. 11, 2008, the contents of which are hereby incorporated by reference into the present application.

The present invention relates to a bush cutter typically used for cutting bushes. Especially, the present invention relates to a type of bush cutter with an operating rod having versatility with respect to different models.

BACKGROUND ART

Japanese Patent Application Publication No. 2006-311828 discloses a bush cutter. The bush cutter comprises an operating rod, a cutting unit provided at a front end of the operating rod, a main unit provided at a rear end of the operating rod, and a transfer shaft provided inside the operating rod. The cutting unit can rotatably support a cutting blade. The main unit houses a motor that drives the cutting blade. The transfer shaft extends from the main unit to the cutting unit, and transfers output torque of the motor from the main unit to the cutting unit.

In the above-described conventional bush cutter, a main unit that houses an engine, instead of a main unit that houses a motor, may be attached to the rear end of the operating rod.

SUMMARY OF INVENTION

Technical Problem

Ordinarily, the operating rod is formed out of general-purpose pipe stock, and is shaped to a simple cylindrical shape. Therefore, the operating rod is not limited to one single model, but can be shared across a plurality of models. However, the operating rod may be erroneously assembled, at the manufacturing facility of the bush cutter, in case that the operating rod is shared in common by a plurality of models. For instance, a problem may arise in that an operating rod prepared for manufacturing a first model that uses a motor as a drive source may end up being used in a second model that uses an engine as a drive source.

In the light of the above, it is an object of the present invention to provide a technique for preventing erroneous assembly of a versatile operating rod that can be used in a plurality of models.

Solution to Technical Problem

The bush cutter realized according to the present invention comprises an operating rod, a cutting unit, a main unit and a transfer shaft. The cutting unit is disposed at a front end of the operating rod, and is configured to rotatably support a cutting blade. The main unit is disposed at a rear end of the operating rod, and houses a motor that drives the cutting blade. The transfer shaft is disposed within the operating rod, and is configured to transfer output torque of the motor from the main unit to the cutting unit.

An adapter is fixed to a rear end portion of the operating rod, at an outer circumferential surface thereof. A rod insertion hole, that receives the rear end portion of the operating rod having the adapter fixed thereto, is formed in the main unit. A shape of the adapter and a shape of the rod insertion hole that receives the adapter can be appropriately designed for each model. The operating rod can be prevented form being assembled into other models by providing the adapter having a special shape in the operating rod having a simple shape. In a case where the operating rod is shared in common by two models, one of the models may have a structure in which the adapter is provided, while the other model has a structure in which the adapter is not provided.

Preferably, the above-described adapter is a sleeve-shaped member and fits onto the outer circumferential surface of the operating rod. Such a structure facilitates easy fixing of the adapter to the operating rod, and facilitates easy attachment of the operating rod, having the adapter fixed thereto, to the main unit.

Preferably, the sleeve-shaped adapter has a tapered shape in which a diameter of the adapter decreases toward the rear end of the operating rod. Specifically, the adapter has preferably a tapered shape tapering off toward the leading end thereof, in the direction in which the operating rod is inserted into the main unit. Such a structure facilitates easy attachment of the operating rod, having the adapter fixed thereto, to the main unit, and allows preventing a positional offset of the adapter upon attachment of the operating rod to the main unit.

Preferably, one of the operating rod and the adapter is provided with a protrusion, and the other of the operating rod and the adapter is provided with a recess configured to engage with the protrusion. Such a configuration allows attaching the adapter to the operating rod at a prescribed position, by engaging the protrusion into the recess, Preferably, the adapter is formed of elastomer material. Forming the adapter out of pliable elastomer material makes it easier for the adapter to be attached to the operating rod, and allows fixing the operating rod to the main unit with no clearance in between.

In a case where the above-described operating rod is a common part with a different model of bush cutter, it is preferable that the operating rod can be attached to a main unit of the different model of bush cutter with the adapter removed. Specifically, other models need not necessarily have a structure that uses the adapter, and need only have a structure such that the operating rod is directly attached to the main unit.

Advantageous Effects of Invention

The present invention allows preventing erroneous assembly of a versatile operating rod, and allows manufacturing accurately a plurality of models of bush cutter using a shared operating rod.

DESCRIPTION OF EMBODIMENT

Preferred aspects of below embodiment will be listed.

(Feature 1) Preferably, an operating rod has a hollow shape (pipe shape), and extends in a straight line.

(Feature 2) Preferably, the operating rod is a shared part between a first model having a motor as a drive source and a second model having an engine as a drive source.

(Feature 3) Preferably, an adapter is a sleeve formed of an elastomer material.

(Feature 4) Preferably, a slit is formed in a rod insertion hole of a main unit.

(Feature 5) In a torque transfer path from the motor to a cutting blade there are preferably provided: a drive side coupling shaft connected to a motor side; a driven side coupling shaft connected to a cutting blade side and adjacent to the drive side coupling shaft in an axial direction; and a coil spring coiled around the drive side coupling shaft and the driven side coupling shaft, straddling both shafts. In this case, preferably, a coiling direction of the coil spring from the drive side coupling shaft to the driven side coupling shaft is the same as a rotation direction of the drive side coupling shaft. Such a configuration allows limiting torque that is transferred from the motor to the cutting blade upon startup of the motor or when the cutting blade is acted upon by excessive external force.

Embodiment

Figure 1:
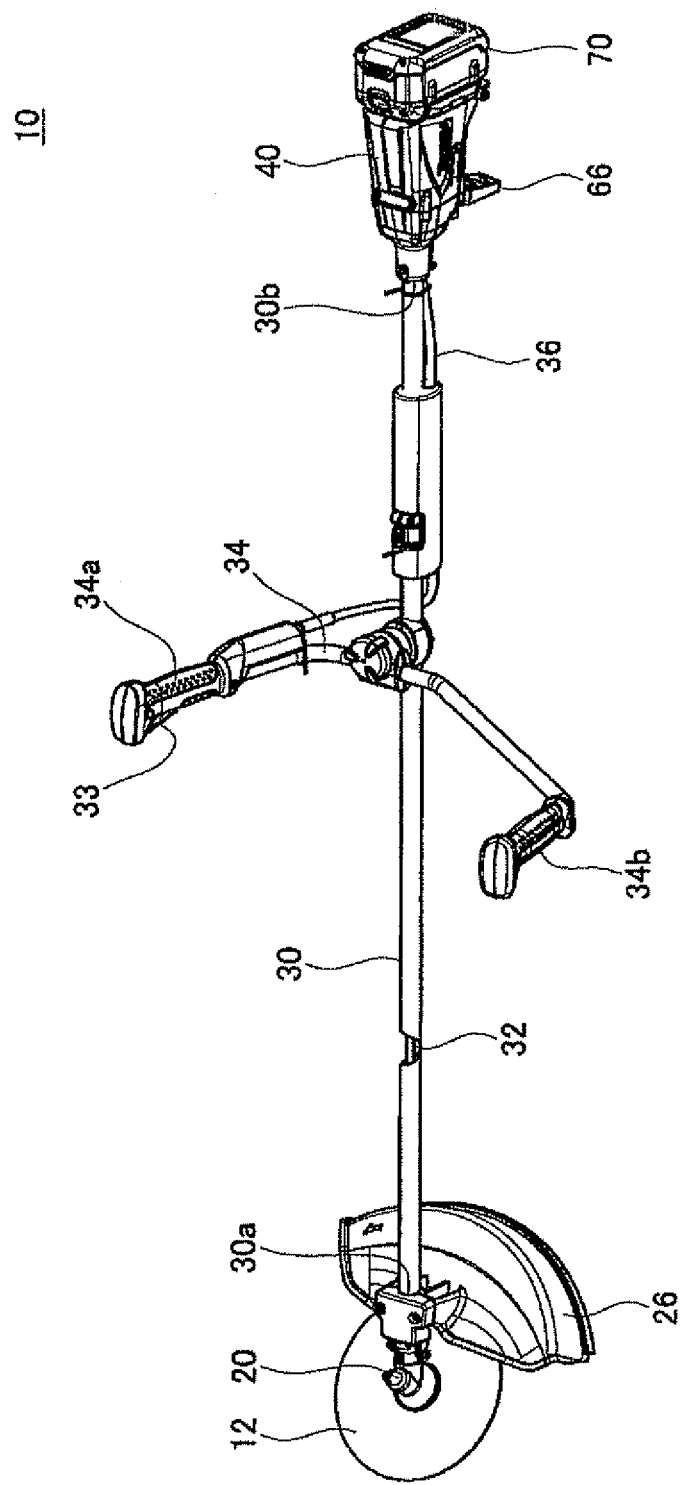
FIG. 1 is a diagram illustrating an outer appearance of a bush cutter in an embodiment.

An embodiment in which the present invention is realized will be explained next with reference to accompanying drawings. FIG. 1 illustrates the outer appearance of a bush cutter 10 of the present embodiment. The bush cutter 10 is a power tool used in a cutting operation such as weed cutting.

As illustrated in FIG. 1, the bush cutter 10 comprises an operating rod 30, a cutting unit 20 provided at a front end 30a of the operating rod 30, and a main unit 40 provided at a rear end 30b of the operating rod 30. The operating rod 30 has a hollow pipe-like shape, and extends in a straight line. A cutting blade 12 is rotatably attached to the cutting unit 20. A motor 46 (FIG. 2) for driving the cutting blade 12 is housed in the main unit 40. A battery pack 70 that supplies electric power to the motor 46 is detachably attached to the main unit 40. A transfer shaft 32 is rotatably housed within the operating rod 30. The transfer shaft 32 extends from the main unit 40 to the cutting unit 20, and transmits output torque of the motor 46 from the main unit 40 to the cutting unit 20.

A handle 34 for gripping by a user is provided in the operating rod 30. The handle 34 comprises a right handle 34a and a left handle 34b. A trigger-type start switch 33 is provided in the right handle 34a. The start switch 33 is electrically connected to the main unit 40 by an electrical cord 36. The electrical cord 36 is routed from the main unit 40, along the operating rod 30, up to the right handle 34a. The motor 46 of the main unit 40 rotates when the start switch 33 is turned on. The motor 46 of the main unit 40 stops when the start switch 33 is turned off.

A stand 66 is provided in the main unit 40. The stand 66 is provided so as to protrude out of the main unit 40. When the bush cutter 10 is set on a ground, the stand 66 abuts the ground, thereby supporting the bush cutter 10.

Figure 2:
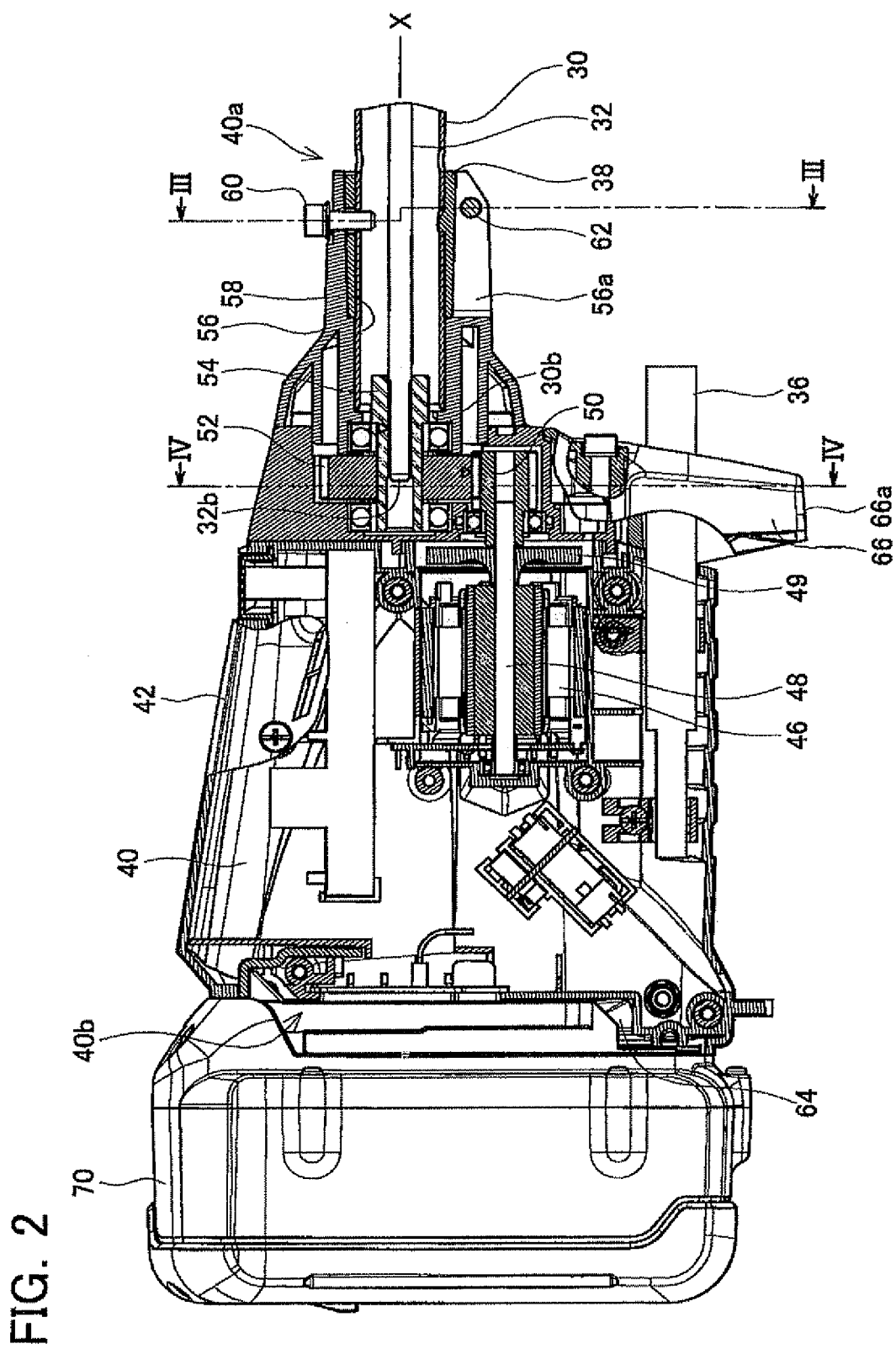
FIG. 2 is a cross-sectional diagram illustrating a configuration of a main unit.
Figure 3:
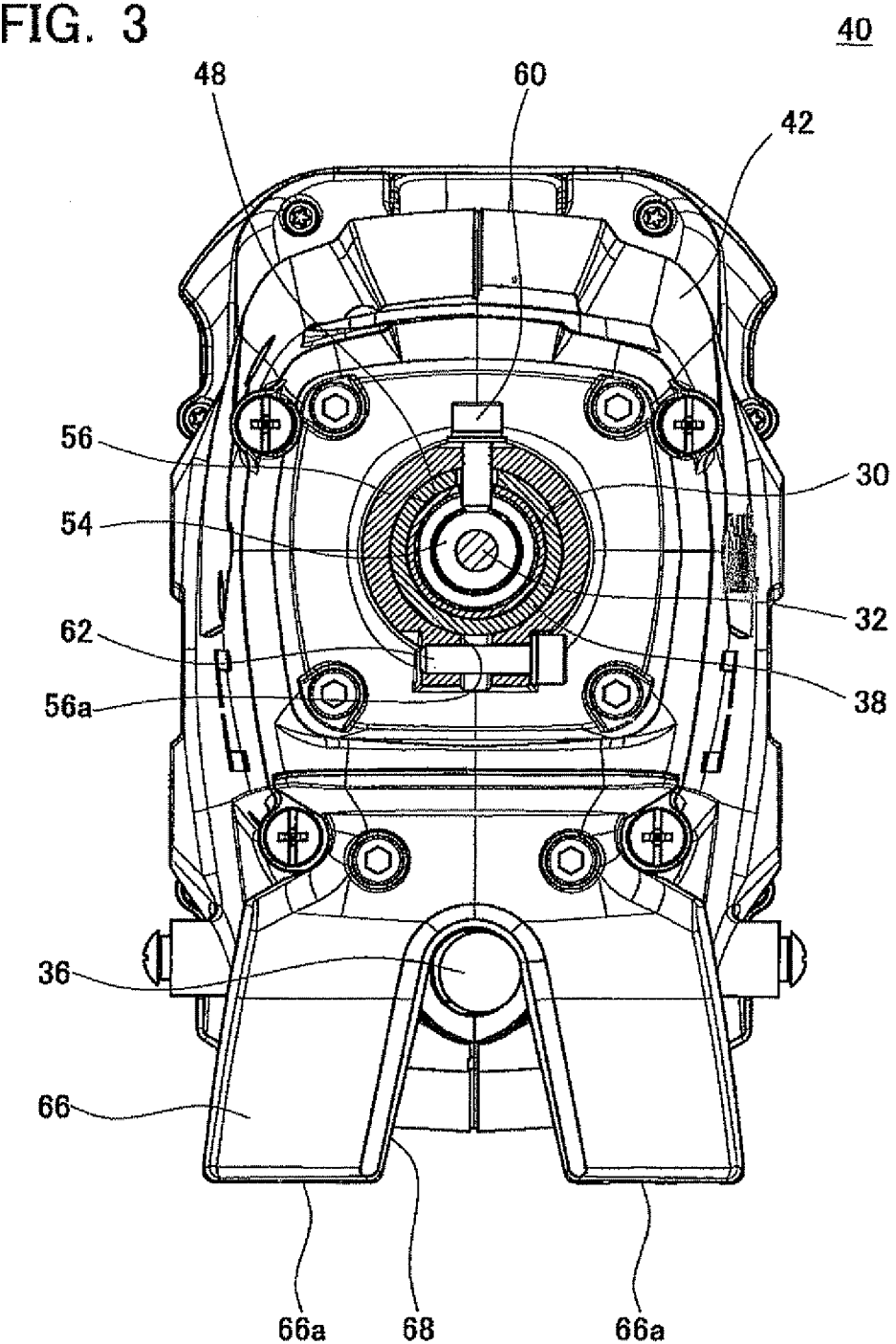
FIG. 3 is a cross-sectional diagram along line in FIG. 2.
Figure 4:
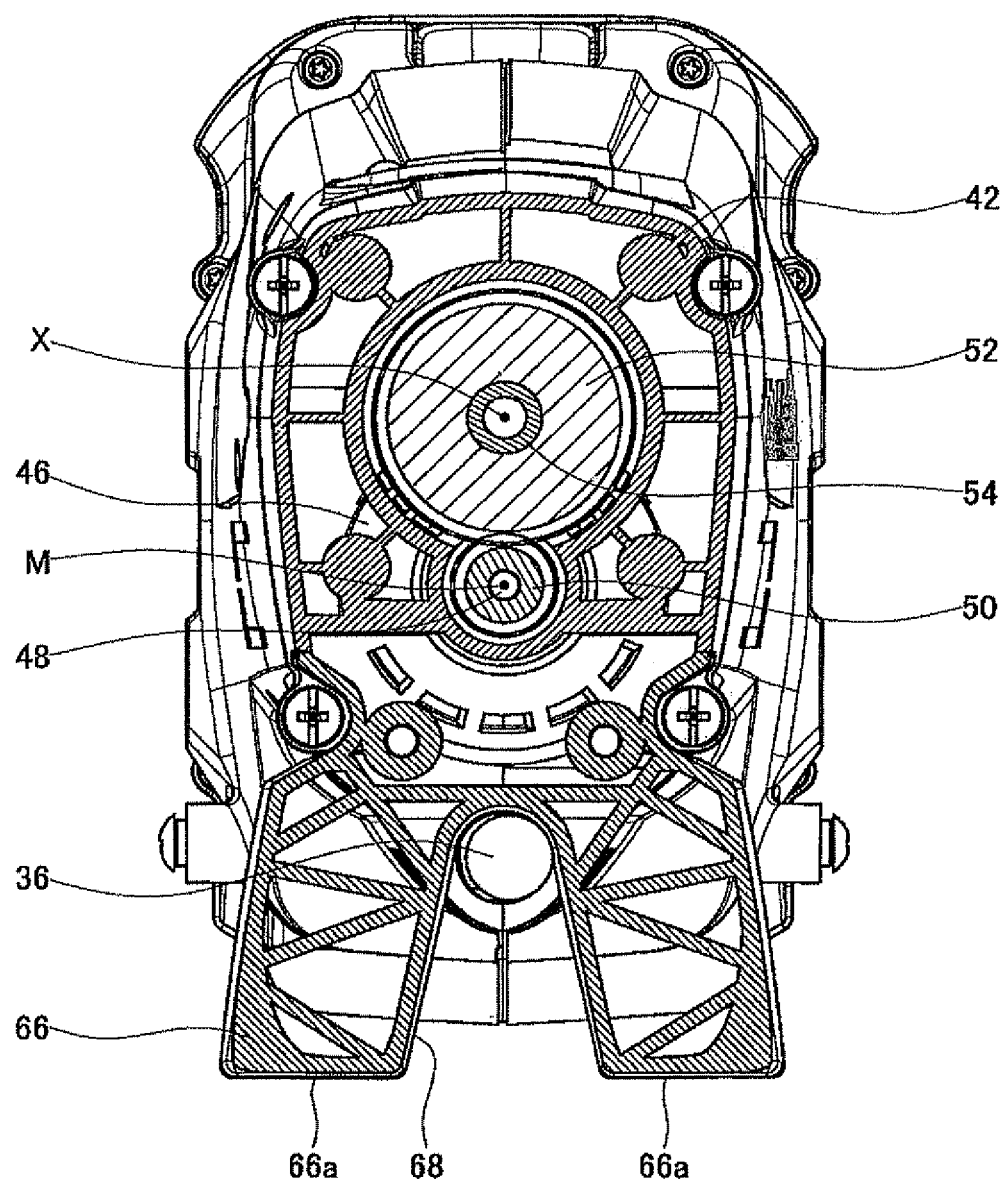
FIG. 4 is a cross-sectional diagram along line IV-IV in FIG. 2.

The configuration of the main unit 40 will be explained with reference to FIG. 2, FIG. 3 and FIG. 4. FIG. 2 is a cross-sectional diagram illustrating the configuration of the main unit 40. The cross-sectional diagram illustrated in FIG. 2 depicts a cross section that encompasses a rotation axis Y of the cutting blade 12 (see FIG. 7) and a central axis X of the operating rod 30. FIG. 3 is a cross-sectional diagram along line III-III in FIG. 2. FIG. 4 is a cross-sectional diagram along line IV-IV in FIG. 2. The central axis X of the operating rod 30 is also a rotation axis X of the transfer shaft 32.

As illustrated in FIG. 2, the main unit 40 comprises a main housing 42. The rear end 30b of the operating rod 30 is fixed to a front portion 40a of the main unit 40. A battery pack interface 64, to/from which the battery pack 70 is attached/detached, is provided at a rear portion 40b of the main unit 40. The above-described stand 66 is detachably bolted to a lower portion of the main housing 42. A contact area 66a for abutting the ground or the like is formed at a leading end portion of the stand 66. The above-described electrical cord 36 is routed so as to extend outward from inside the main housing 42, up to the operating rod 30, across the stand 66.

As illustrated in FIG. 3 and FIG. 4, a cord passage section 68 for allowing the electrical cord 36 to pass is formed in the stand 66. The cord passage section 68 has a notched shape continuing from an outer edge of the stand 66. The cord passage section 68 having the notched shape continues from substantially a center of the contact area 66a of the stand 66 toward the main unit 40. The cord passage section 68 having the notched shape becomes narrower as the cord passage section 68 extends from of the contact area 66a of the stand 66 toward the main unit 40.

Pinching of the electrical cord 36 between the ground and the contact area 66a of the stand 66 can be averted, upon setting of the bush cutter 10 on the ground, if the cord passage section 68 is formed in the stand 66. A shape of the cord passage section 68 may be a notch, as illustrated in the present embodiment, or may be a hole running through the stand 66. However, the electrical cord 36 can be arranged more easily in the cord passage section 68 during manufacture or re-assembly after repair, of the bush cutter 10, if the cord passage section 68 has the notched shape. In particular, the operation of arranging the electrical cord 36 on the cord passage section 68 becomes simpler if a width of the cord passage section 68 expands toward an opening side of the cord passage section 68. Loss of strength of the stand 66 resulting from forming the cord passage section 68 can be averted if the cord passage section 68 having the notched shape continues from the contact area 66a of the stand 66 toward the main unit 40.

As illustrated in FIG. 2 and FIG. 4, in the main housing 42 the motor 46 for driving the cutting blade 12, a first gear 50 fixed to an output shaft 48 of the motor 46 so as not to be capable of rotating relative to the output shaft 48, and a second gear 52 that engages with the first gear 50 are provided. A rear end 32b of the transfer shaft 32 is fixed to second gear 52, via a coupling member 54, so as not to be capable of rotating relative to the second gear 52. Output torque of the motor 46 is transferred to the transfer shaft 32 via the first gear 50 and the second gear 52. The second gear 52 is larger than the first gear 50. Also, a number of teeth of the second gear 52 is greater than the number of teeth of the first gear 50. As a result, the output torque of the motor 46 is amplified between the first gear 50 and the second gear 52. That is, the first gear 50 and the second gear 52 constitute a first reduction mechanism that amplifies the output torque of the motor 46, between the motor 46 and the transfer shaft 32. Cooling fins 49 are provided on the output shaft 48 of the motor 46.

As illustrated in FIG. 4, a rotation axis M of the motor 46 is positioned below the rotation axis X of the transfer shaft 32. More precisely, the rotation axis M of the motor 46 is positioned vertically below the rotation axis X of the transfer shaft 32, when the rotation axis Y of the cutting blade 12 and the rotation axis X of the transfer shaft 32 are positioned within a vertical plane, and the rotation axis X of the transfer shaft 32 is positioned within a horizontal plane. Such a configuration allows the balance of the bush cutter 10 to be readily stabilized during a bush cutting operation through gripping of the handle 34 by the user. The rotation axis M of the motor 46 may be positioned above the rotation axis X of the transfer shaft 32. In this configuration as well, the balance of the bush cutter 10 becomes comparatively stable.

Figure 5:
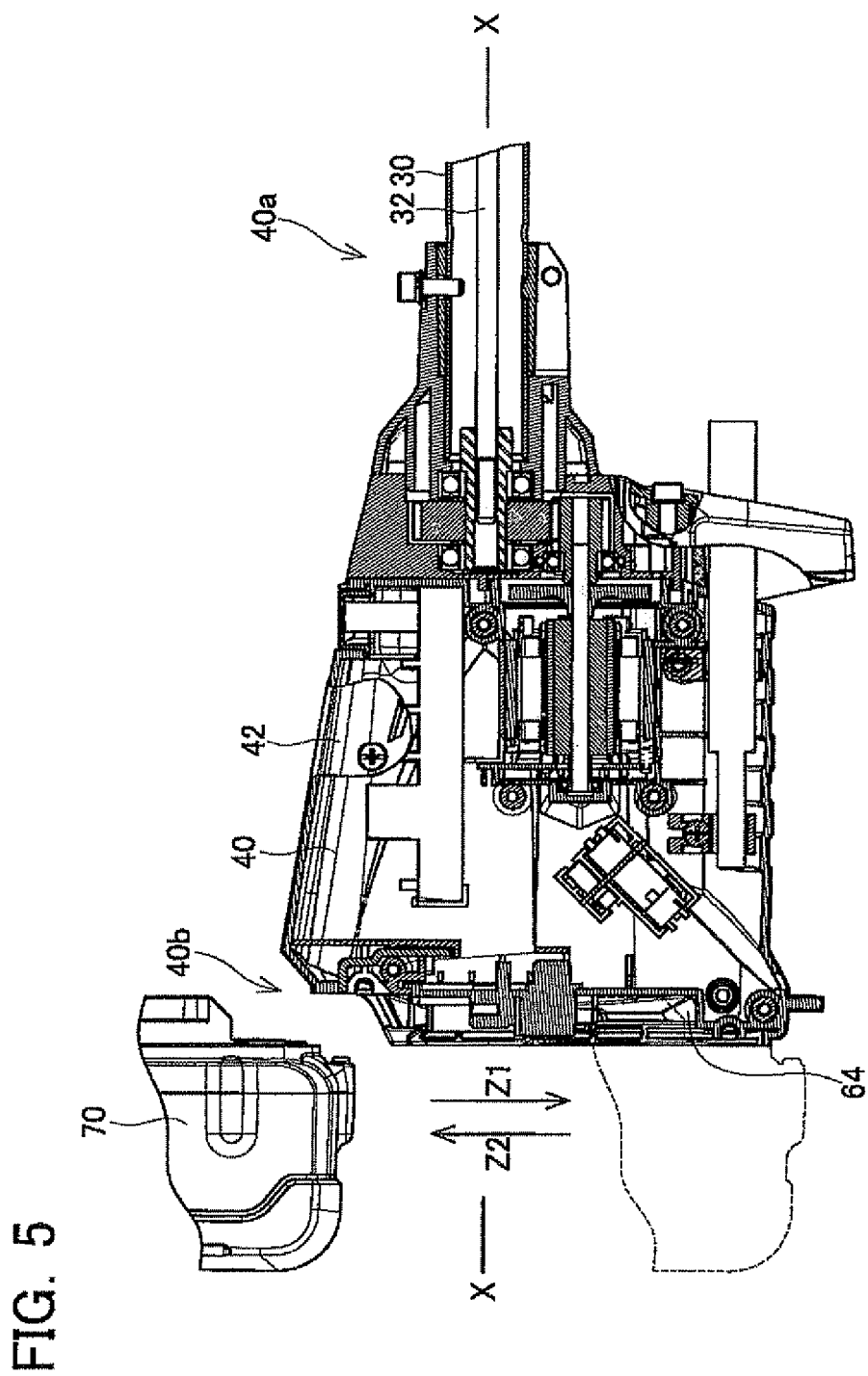
FIG. 5 is a diagram illustrating a sliding direction of a battery pack.

An attachment structure of the battery pack 70 in the main unit 40 will be explained next with reference to FIG. 2 and FIG. 5. As illustrated in FIG. 2, the battery pack interface 64 is formed at the rear portion 40b of the main unit 40. The battery pack interface 64 has a structure that allows the battery pack 70 to be attached and detached. As illustrated in FIG. 5, the battery pack interface 64 slidably receives the battery pack 70. Arrows Z1 and Z2 in FIG. 5 indicate a sliding direction of the battery pack 70 in the battery pack interface 64. The sliding direction of the battery pack 70 in the battery pack interface 64 is substantially perpendicular to the central axis X of the operating rod 30. The downward-pointing arrow Z1 denotes the sliding direction of the battery pack 70 during the attachment thereof; while the upward-pointing arrow Z2 denotes the sliding direction of the battery pack 70 during the detachment thereof. Thus, the sliding direction upon the attachment of the battery pack 70 to the battery pack interface 64 becomes downward, and the sliding direction upon the detachment of the battery pack 70 from the battery pack interface 64 becomes upward. More precisely, the sliding direction upon the attachment of the battery pack 70 to the battery pack interface 64 becomes vertically downward, and the sliding direction upon the detachment of the battery pack 70 from the battery pack interface 64 becomes vertically upward, when the rotation axis Y of the cutting blade 12 and the rotation axis X of the transfer shaft 30 are positioned within the vertical plane, and the rotation axis X of the transfer shaft 30 is positioned within the horizontal plane.

In the bush cutter 10 of the present embodiment, as described above, the sliding direction (Z1, Z2) of the battery pack 70 in the battery pack interface 64 is not parallel to the central axis X of the operating rod 30, but is angled with respect to the central axis X of the operating rod 30. Upon attachment and detachment of the battery pack 70 while the user is gripping the operating rod 30, the above configuration makes it unlikelier for the operating rod 30 to slip from the user's hand, and makes forces easier to be exerted onto the operating rod 30 and the battery pack 70. The battery pack 70 can be attached and detached more easily as a result. Herein, the sliding direction (Z1, Z2) of the battery pack 70 need not necessarily be perpendicular to the central axis X of the operating rod 30. Preferably, however, the angle formed by the sliding direction (Z1, Z2) of the battery pack 70 and the central axis X of the operating rod 30 is a large angle. In particular, it is found that that significant effects are elicited when the angle is 45° or greater.

The bush cutter 10 of the present embodiment is configured in such a manner that the sliding direction upon the attachment of the battery pack 70 to the battery pack interface 64 becomes downward, and that the sliding direction upon the detachment of the battery pack 70 from the battery pack interface 64 becomes upward. As a result, neither the battery pack 70 nor the hand of the user who is gripping the battery pack 70 is hampered by the ground upon attachment and detachment of the battery pack 70 in a state where the bush cutter 10 is set on the ground using the stand 66.

A further explanation follows next on a positional relationship between the battery pack 70 that is fitted to the main unit 40, and the rotation axis X of the motor 46 and the rotation axis Y of the transfer shaft 32. The battery pack 70 is attached to the rear portion 40b of the main unit 40 and is positioned on an extension line of the rotation axis X of the motor 46 and the rotation axis Y of the transfer shaft 32. The battery pack 70 has a substantially rectangular parallelepiped shape. A longitudinal direction of the battery pack 70, when fitted to the main unit 40, is an up-and-down direction in FIG. 2. Specifically, the longitudinal direction of the battery pack 70 fitted to the main unit 40 matches a direction in which the rotation axis X of the motor 46 and the rotation axis Y of the transfer shaft 32 are arrayed. The main unit 40 can be made comparatively small by a structure such that the direction in which the rotation axis X of the motor 46 and the rotation axis Y of the transfer shaft 32 are arrayed (specifically, the direction in which the transfer shaft 32 and the output shaft 48 of the motor 46 are arrayed) matches the longitudinal direction of the battery pack 70 fitted to the main unit 40.

An explanation follows next on a connecting structure between the main unit 40 and the operating rod 30, with reference to FIG. 2 and FIG. 3. A tubular and protruding rod fixing section 56 is provided at the front portion 40a of the main unit 40. The rod fixing section 56 is bolted to the main housing 42. A rod insertion hole 58 is formed in the rod fixing section 56. A rear end portion (a portion over the length of the operating rod 30 that encompasses the rear end 30b) is inserted into the rod insertion hole 58. A tubular sleeve 38, formed of elastomer material, is provided at the rear end portion of the operating rod 30. The rear end portion of the operating rod 30 is inserted, together with the sleeve 38, into the rod insertion hole 58 of the rod fixing section 56. A slit 56a is formed in the rod fixing section 56, such that the rod insertion hole 58 widens upon insertion of the operating rod 30. The operating rod 30 inserted into the rod insertion hole 58 is fixed by two bolts 60, 62.

Figure 6:
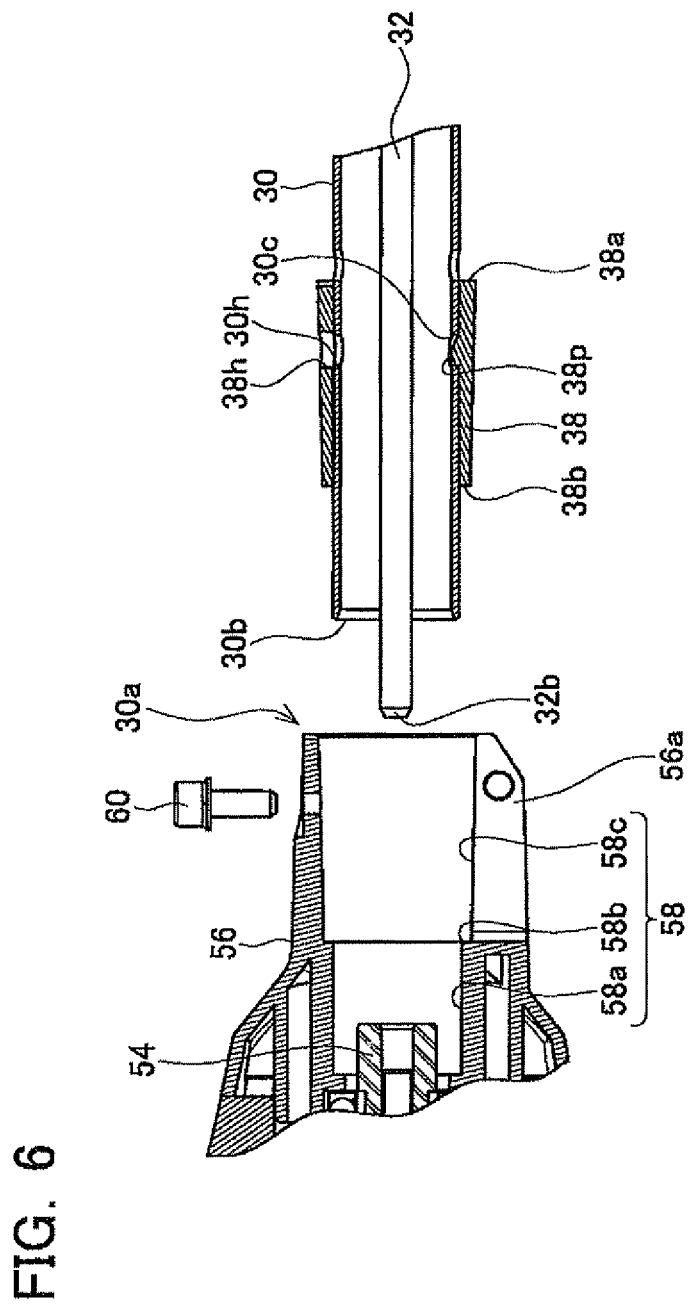
FIG. 6 a diagram illustrating a fixing structure of an operating rod in the main unit.

FIG. 6 illustrates a state in which the operating rod 30 is detached from the rod fixing section 56. As illustrated in FIG. 6, the sleeve 38 fits onto an outer circumferential surface of the operating rod 30. The sleeve 38 has a tapered shape, such that the diameter of the sleeve 38 decreases from one end 38a to another end 38b. That is, the diameter of the sleeve 38 decreases toward the rear end 30b of the operating rod 30. The tapered shape of the sleeve 38 facilitates easy insertion of the operating rod 30, together with the sleeve 38, into the rod insertion hole 58. A protrusion 38p is formed on the inner face of the sleeve 38a. The protrusion 38p engages with a recess (through-hole) 30c that is formed in the operating rod 30. As a result, the sleeve 38 is prevented from moving with respect to the operating rod 30 upon insertion of the operating rod 30, together with the sleeve 38, into the rod insertion hole 58.

The rod insertion hole 58 of the rod fixing section 56 has a shape corresponding to that of the operating rod 30 having the sleeve 38 fixed thereto. As illustrated in FIG. 6, the rod insertion hole 58 comprises a first portion 58a at which the operating rod 30 is directly inserted, a second portion 58c at which the operating rod 30 is inserted together with the sleeve 38, and a step 58b formed between the first portion 58a and the second portion 58c. The first portion 58a has a constant diameter in the axial direction, so as to conform to the shape of the operating rod 30. The second portion 58c has a tapered shape with a changing diameter in the axial direction, so as to conform to the shape of the sleeve 38.

The operating rod 30 is formed out of general-purpose pipe stock, and is shaped to a simple cylindrical shape. As a result, the operating rod 30 can be used not only in the bush cutter 10 of the present embodiment, but also in other models. An operating rod of a bush cutter having an engine as a power source is used in the bush cutter 10 of the present embodiment. However, the operating rod 30 may be wrongly assembled, at the manufacturing facility of the bush cutter 10, in case that the operating rod 30 is shared across various models. Specifically, a problem may arise in that the operating rod 30 prepared for manufacture of the bush cutter 10 of the present embodiment ends up being employed in the manufacture of other models.

To deal with the above issue, the sleeve 38 is provided in the operating rod 30 of the bush cutter 10 of the present embodiment, to prevent thereby the operating rod 30 from being assembled into other models. Assembly of the operating rod 30 into other models can be prevented by providing the sleeve 38, having a special shape, in the operating rod 30 having a simple shape. The sleeve 38 functions as an adapter that adapts the operating rod 30 to the rod insertion hole 58. In a case where the operating rod 30 is shared by two models, one of the models may have a structure that requires the sleeve 38, while the other model has a structure that does not require the sleeve 38. As regards the present embodiment, engine type bush cutters that share the operating rod 30 have a structure that does not require the sleeve 38. Therefore, the operating rod 30 with the sleeve 38 attached thereto cannot be assembled into such engine type bush cutters.

Figure 7:
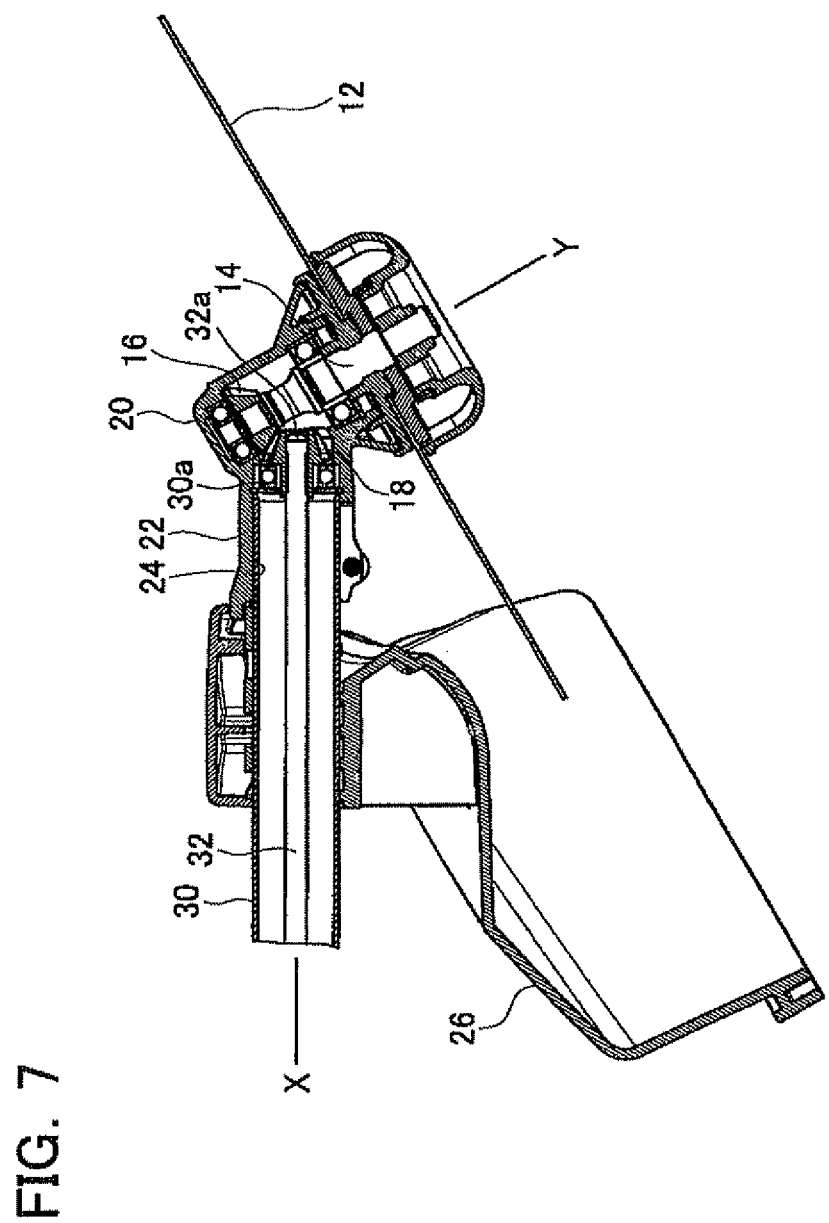
FIG. 7 is a cross-sectional diagram illustrating a configuration of a cutting unit.

An explanation follows next, with reference to FIG. 7, on the configuration of the cutting unit 20. As illustrated in FIG. 7, a rod fixing section 22 is formed in the cutting unit 20. A rod insertion hole 24 is formed in the rod fixing section 22. A front end portion (a portion over the length of the operating rod 30 that encompasses a front end 30a) is inserted into the rod insertion hole 24. A cutting blade shaft 14 is rotatably provided in the cutting unit 20. A disc-like cutting blade 12 is attached to the cutting blade shaft 14. Instead of the disc-like cutting blade 12, a rope-like cutting blade, of nylon cord or the like, may also be attached to the cutting blade shaft 14. A safety cover 26 is provided in the cutting unit 20.

A third gear 18 and a fourth gear 16 are provided in the cutting unit 20. The third gear 18 is fixed to the front end 32a of the transfer shaft 32, so as not to be capable of rotating relative to the transfer shaft 32. The fourth gear 16 is fixed to the cutting blade shaft 14, so as not to be capable of rotating relative to the cutting blade shaft 14, and engages with the third gear 18. The third gear 18 and the fourth gear 16 are bevel gears. Torque from the transfer shaft 32 is transferred to the cutting blade shaft 14 via the third gear 18 and the fourth gear 16. The fourth gear 16 is larger than the third gear 18. The number of teeth of the fourth gear 16 is greater than the number of teeth of the third gear 18. As a result, torque from the transfer shaft 32 is amplified between the third gear 18 and the fourth gear 16. Specifically, the third gear 18 and the fourth gear 16 constitute a second reduction mechanism that amplifies the torque from the transfer shaft 32, between the transfer shaft 32 and the cutting blade shaft 14. In the bush cutter 10, the output torque of the motor 46 is amplified in two stages, by the first gear 50 and the second gear 52 (first reduction mechanism) provided in the main unit 40, and by the third gear 18 and fourth gear 16 (second reduction mechanism) provided in the cutting unit 20.

In the bush cutter 10, as described above, the sliding direction of the battery pack 70 in the battery pack interface 64 is angled with respect to the central axis X of the operating rod 30. The above configuration makes it unlikelier for the operating rod 30 to slip from the user's hand, and facilitates easy operation of attachment and detachment the battery pack 70 upon attachment and detachment of the battery pack 70 while the user is gripping the operating rod 30.

A cord passage section 68 for allowing the electrical cord 36 to pass is formed in the stand 66 of the main unit 40 of the bush cutter 10. As a result, the electrical cord 36 is not pinched between the stand 66 and the ground, and damage to the electrical cord 36 is prevented, upon setting of the bush cutter 10 on the ground.

In the bush cutter 10, the sleeve 38 (adapter) is fixed to the outer circumferential surface of the rear end portion of the operating rod 30, and the main unit 40 has formed therein the rod insertion hole 58 that receives the rear end portion of the operating rod 30 having the sleeve 38 fixed thereto. Such a structure allows preventing the operating rod 30 from being erroneously used in the manufacture of other models.

In the bush cutter 10, reduction mechanisms for amplifying the output torque of the motor 46 are provided in the main unit 40 and in the cutting unit 20. Specifically, the first gear 50 and the second gear 52 constitute the first reduction mechanism, in the main unit 40, while the third gear 18 and the fourth gear 16 constitute the second reduction mechanism, in the cutting unit 20. Such a structure allows significantly amplifying the output torque of the motor 46 without increasing the size of the main unit 40 or of the cutting unit 20. This allows, as a result, using a high-revolutions type (low-torque type) small motor as the motor 46.

Figure 8:
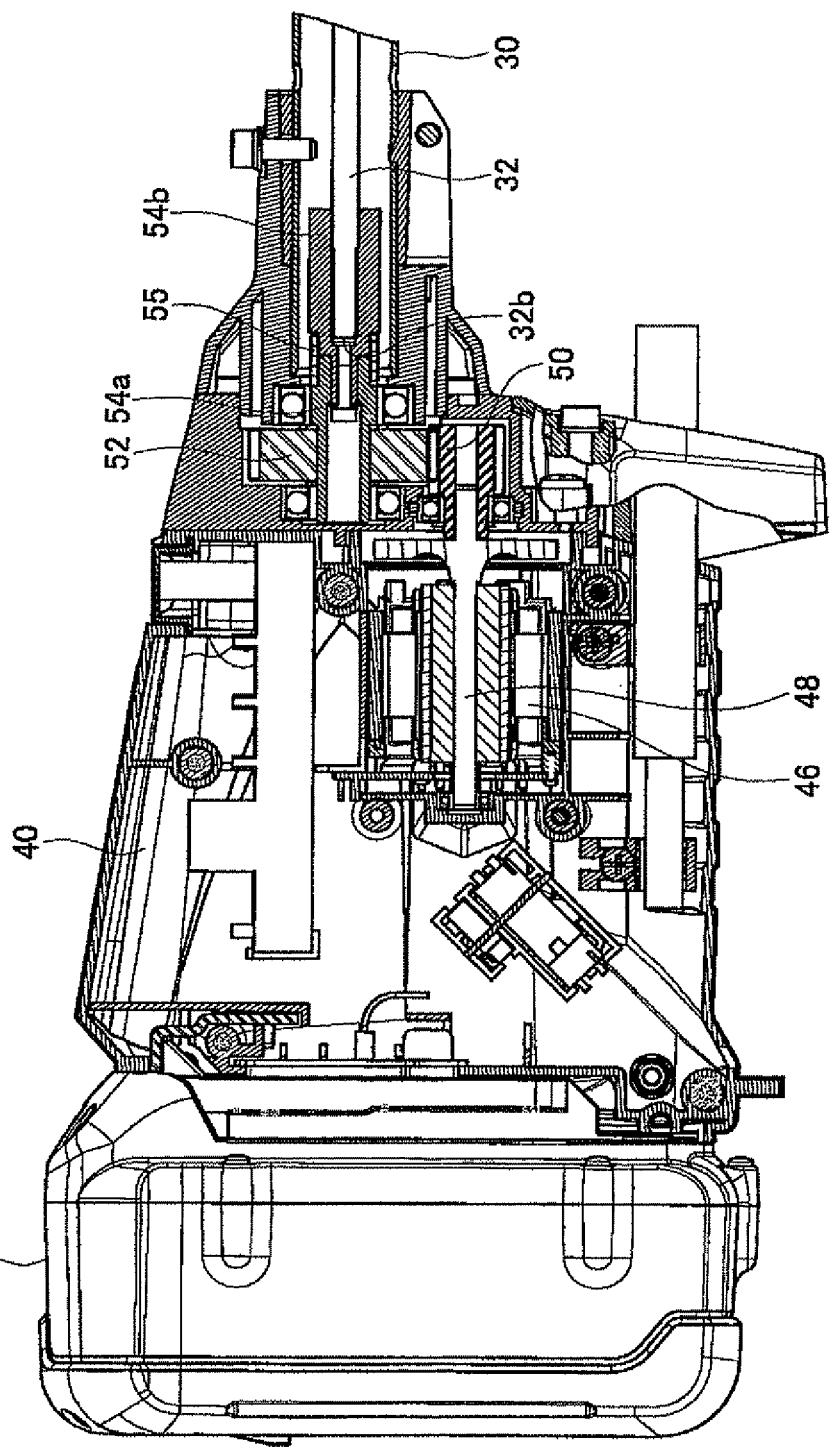
FIG. 8 is a diagram illustrating a variation of the main unit.

FIG. 8 illustrates a variation of the main unit 40. In the variation illustrated in FIG. 8, the coupling structure of the second gear 52 and the transfer shaft 32 in the above-described main unit 40 is modified. Specifically, a drive side coupling shaft 54a is fixed to the second gear 52 so as not to rotate relative to the second gear 52, while a driven side coupling shaft 54b is fixed to the transfer shaft 32 so as not to rotate relative to the transfer shaft 32. The drive side coupling shaft 54a and the driven side coupling shaft 54b are adjacent to each other, in the axial direction, across a gap therebetween.

A coil spring 55 is coiled around the drive side coupling shaft 54a and the driven side coupling shaft 54b, straddling both shafts. Specifically, the drive side coupling shaft 54a is inserted into an inner hole of the coil spring 55, from one end of the latter, and the driven side coupling shaft 54b is inserted from the other end of the coil spring 55. The coil spring 55 is a square-cross section spring in which the cross-sectional shape of the coil wire is square. The inner diameter of the coil spring 55, in a natural shape, is smaller than the outer diameter of the drive side coupling shaft 54a and the driven side coupling shaft 54b. The coil spring 55 is thus elastically deformed so as to clamp the drive side coupling shaft 54a and the driven side coupling shaft 54b. As a result, the torque from the drive side coupling shaft 54a is transferred to the driven side coupling shaft 54b via the coil spring 55.

The coiling direction of the coil spring 55 from the drive side coupling shaft 54a to the driven side coupling shaft 54b is the same as the rotation direction of the drive side coupling shaft 54a. When the rotation speed of the driven side coupling shaft 54b is lower than that of the drive side coupling shaft 54a, the coil spring 55 deforms elastically and the inner diameter thereof expands. Therefore, torque transfer from the drive side coupling shaft 54a to the driven side coupling shaft 54b is restrained through expansion of the inner diameter of the coil spring 55, for instance upon start of the motor 46. As a result, the cutting blade 12 is driven gently at the start of the operation of the bush cutter 10. In case that the cutting blade 12 hits a stone or the like, and a strong braking force acts on the cutting blade 12, torque transfer from the drive side coupling shaft 54a to the driven side coupling shaft 54b is blocked likewise through expansion of the inner diameter of the coil spring 55. Damage to the cutting blade 12, and kickback in the bush cutter 10 (jumping of the bush cutter 10 on account of the reaction from an object against which the bush cutter 10 hits) are prevented as a result.

When the rotation speed of the driven side coupling shaft 54b is greater than that of drive side coupling shaft 54a, the inner diameter of the coil spring 55 shrinks, and the shafts become strongly coupled. Therefore, the cutting blade 12 is prevented from keeping on rotating, on account of inertia, after stopping of the motor 46.

A torque transfer structure that uses the above-described coil spring 55 may be provided on the side of the cutting unit 20, instead of on the side of the main unit 40. Specifically, the drive side coupling shaft 54*a* may be provided at the front end 32*a* of the transfer shaft 32, and the driven side coupling shaft 54*b* at the third gear 18, such that the drive side coupling shaft 54*a* and the driven side coupling shaft 54*b* are coupled by the coil spring 55. Alternatively, the torque transfer structure may be provided between the first gear 50 and the output shaft 48 of the motor 46.

Specific embodiment of the present teachings is described above, but this merely illustrates some representative possibilities for utilizing the teachings and does not restrict the claims thereof. The subject matter set forth in the claims includes variations and modifications of the specific examples set forth above. The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

The invention claimed is:

1. A bush cutter comprising:
an operating rod;
a cutting unit disposed at a front end of the operating rod and configured to rotatably support a cutting blade;
a main unit disposed at a rear end of the operating rod;
a motor that drives the cutting blade; and
an adapter fixed to an outer circumferential surface of the rear end of the operating rod, wherein the main unit is provided with a rod insertion hole receiving the rear end of the operating rod with the adapter fixed, wherein:
the rod insertion hole comprises a first portion and a second portion along a longitudinal direction of the rod insertion hole;
the first portion has a constant diameter along the longitudinal direction and is configured to directly hold the operating rod; and
the second portion has a diameter that changes along the longitudinal direction and is configured to hold the adapter fixed to the operating rod.

2. A bush cutter as in claim 1, wherein the adapter is a sleeve-shaped member and fits onto the outer circumferential surface of the operating rod.

3. A bush cutter as in claim 2, wherein the sleeve-shaped adapter has a tapered shape in which a diameter of the adapter decreases toward the rear end of the operating rod.

4. A bush cutter as in claim 1, wherein one of the operation rod and the adapter is provided with a protrusion, and the other of the operation rod and the adapter is provided with a recess configured to engage with the protrusion.

5. A bush cutter as in claim 1, wherein the adapter is made of elastomer material.

6. A bush cutter as in claim 1, wherein the operating rod is a common part with a different model of bush cutter, and the operating rod is configured to be attached to a main unit of the different model of bush cutter with the adapter removed.

7. A bush cutter as in claim 2, wherein one of the operation rod and the adapter is provided with a protrusion, and the other of the operation rod and the adapter is provided with a recess configured to engage with the protrusion.

8. A bush cutter as in claim 7, wherein the adapter is made of elastomer material.

9. A bush cutter as in claim 7, wherein the operating rod is a common part with a different model of bush cutter, and the operating rod is configured to be attached to a main unit of the different model of bush cutter with the adapter removed.

10. A bush cutter as in claim 3, wherein one of the operation rod and the adapter is provided with a protrusion, and the other of the operation rod and the adapter is provided with a recess configured to engage with the protrusion.

11. A bush cutter as in claim 10, wherein the adapter is made of elastomer material.

12. A bush cutter as in claim 10, wherein the operating rod is a common part with a different model of bush cutter, and the operating rod is configured to be attached to a main unit of the different model of bush cutter with the adapter removed.

13. A bush cutter as in claim 4, wherein the adapter is made of elastomer material.

14. A bush cutter as in claim 4, wherein the operating rod is a common part with a different model of bush cutter, and the operating rod is configured to be attached to a main unit of the different model of bush cutter with the adapter removed.

15. A bush cutter as in claim 1, wherein the motor is housed within the main unit, and the bush cutter further comprises a transfer shaft disposed within the operating rod and configured to transfer output torque of the motor from the main unit to the cutting unit.

* * * * *